United States Patent [19]
Meermans

[11] Patent Number: 4,599,669
[45] Date of Patent: Jul. 8, 1986

[54] MAGNETIC-TAPE CASSETTE HAVING AN ELEMENT FOR CLEANING A TAPE DRIVE CAPSTAN DURING NORMAL OPERATION

[75] Inventor: Matheus J. M. Meermans, Eindhoven, Netherlands

[73] Assignee: U.S. Philips Corporation, New York, N.Y.

[21] Appl. No.: 518,496

[22] Filed: Jul. 29, 1983

[30] Foreign Application Priority Data

May 26, 1983 [NL] Netherlands .......................... 8301863

[51] Int. Cl.⁴ ......................... G11B 23/02; G11B 5/10; G11B 5/127; G11B 5/41

[52] U.S. Cl. ..................................... 360/132; 360/128; 360/137; 360/130.33

[58] Field of Search .................. 242/199, 76; 360/128, 360/132, 130.33, 130.32, 130.3; 15/100, DIG. 12, DIG. 13

[56] References Cited

U.S. PATENT DOCUMENTS

| | | | |
|---|---|---|---|
| 2,873,318 | 2/1959 | Moore | 360/130.32 |
| 4,158,871 | 6/1979 | Leaming | 360/132 |
| 4,257,077 | 3/1981 | Ishida | 360/132 |
| 4,376,962 | 3/1983 | Gunschmann et al. | 360/130.21 |
| 4,451,864 | 5/1984 | Prodinger | 360/130.33 |
| 4,454,550 | 6/1984 | Clausen et al. | 360/128 |
| 4,458,281 | 7/1984 | Kara | 360/128 |
| 4,498,115 | 2/1985 | Hofmann | 360/128 |

FOREIGN PATENT DOCUMENTS

| | | | |
|---|---|---|---|
| 0114115 | 7/1984 | European Pat. Off. | 360/128 |
| 52-18306 | 2/1977 | Japan | 360/128 |
| 2018492A | 10/1979 | United Kingdom | 360/130.33 |
| 2073470A | 10/1981 | United Kingdom | 360/128 |

*Primary Examiner*—A. J. Heinz
*Assistant Examiner*—Alfonso Garcia
*Attorney, Agent, or Firm*—David R. Treacy

[57] ABSTRACT

A cleaning element is mounted between guide walls of a tape cassette housing for movement perpendicular to the front wall of the cassette. A spring presses the cleaning element radially against the capstan during normal tape transport past the capstan.

9 Claims, 4 Drawing Figures

30 29 10 15 14 31 11 27 28 32 8a

MAGNETIC-TAPE CASSETTE HAVING AN ELEMENT FOR CLEANING A TAPE DRIVE CAPSTAN DURING NORMAL OPERATION

BACKGROUND OF THE INVENTION

The invention relates to a magnetic-tape cassette having a cleaning element for cleaning the capstan of a magnetic-tape apparatus; and more particularly to such a cassette having a front wall along which a part of the magnetic tape runs for cooperation with parts of the magnetic-tape apparatus, the cleaning element being situated near the front wall of said housing and comprising a cleaning portion which is pointed towards the free end.

A magnetic-tape cassette of this type is disclosed in British Patent Application No. 2,103,180, to which U.S. Pat. No. 4,498,115 corresponds. In this known cassette a cleaning element is secured to a wall of the cassette housing near the fixing portion which is remote from the free end. It has been found that under specific conditions this construction may give rise to vibrations in the cleaning element, which may impair a satisfactory engagement of the cleaning element with the capstan during operation. Moreover, the cleaning element of this known cassette is arranged substantially tangentially near the capstan, which may give rise to stick-slip effects during operation. Under certain conditions these vibrations and stick-slip effects may adversely affect the cleaning action of the cleaning element.

SUMMARY OF THE INVENTION

It is the object of the present invention to provide a magnetic-tape cassette of the type mentioned in the opening paragraph in which the cleaning element provides an optimum cleaning action under all conditions.

To this end the invention is characterized in that the cleaning element is guided to be movable in a direction substantially perpendicular to the front wall between two guide walls which are connected to the housing, and is urged towards the front wall by spring means, in such a way that during operation the pressure of the cleaning element on the capstan is directed substantially radially.

In this way the cleaning element is effectively supported near the guide walls, so that forces exerted by the capstan can be transmitted effectively to the remainder of the housing and vibrations in the cleaning element are precluded. Moreover, the stick-slip effects are precluded by the radial pressure exerted on the capstan by the cleaning element, under the influence of the spring means means, on the capstan which rotates about an axis perpendicular to the major walls.

In addition, the spring means ensure that the cleaning element of the magnetic-tape cassette in accordance with the invention correctly engages with and thereby correctly cleans capstans of different diameters in various types of magnetic-tape cassette equipment. Further, because of the arrangement of the cleaning element in the housing the contact area of the cleaning portion with the capstan is situated substantially diametrally relative to the contact area of the capstan with the magnetic tape. This means that the pointed end of the cleaning portion can be situated at a maximal distance from the front wall, which has the advantage that if a magnetic head is inserted through the relevant opening in the front wall in another position of the magnetic-tape cassette this head will remain clear of the pointed end of the cleaning portion.

A preferred embodiment of a magnetic-tape cassette in accordance with the invention is characterized in that near the end which is remote from the cleaning portion the cleaning element comprises two elastic limbs of substantially equal length, which limbs constitute the spring means, extend substantially perpendicularly to the guiding direction of the cleaning element, and are guided near the free ends between guide portions connected to the housing, so as to be movable in the longitudinal direction. This yields a cleaning element which can be manufactured easily, for example from a plastic material, which is capable of effectively adapting its position in a radial direction relative to the capstan, and which guarantees a correct engagement of the cleaning element with the capstan.

In this respect a further embodiment of the invention is characterized in that, in a direction perpendicular to the major walls of the cassette, the height of the limbs is smaller than the height of the remainder of the cleaning element; and the cleaning element is arranged symmetrically relative to a plane of symmetry which is situated equidistantly between the major walls. Owing to this arrangement the cleaning element is capable of performing a tilting movement about an axis parallel to the longitudinal direction of the limbs. This movement capability is important when the cassette is inserted into the magnetic-tape apparatus, to allow the cleaning element to assume the correct position relative to to the capstan. Owing to the symmetrical arrangement it is irrelevant in which position the cassette is inserted.

In view of the foregoing a further preferred embodiment of the invention is characterized in that, in a direction perpendicular to the major walls, near each end the cleaning portion adjoins a respective obliquely oriented sliding wall of the cleaning element. When the cassette is inserted into the magnetic-tape apparatus, the sliding walls allow a smooth sliding movement of the cleaning element along the free end of the capstan without the risk of damage to the cleaning element and/or the capstan. Again it is important that this is possible in both positions of the magnetic-tape cassette, that is, with the upper or the lower major wall placed on the apparatus.

Two embodiments of the invention will now be described in more detail, by way of example, with reference to the drawings.

DESCRIPTION OF THE PREFERRED EMBODIMENTS

Figure 1:
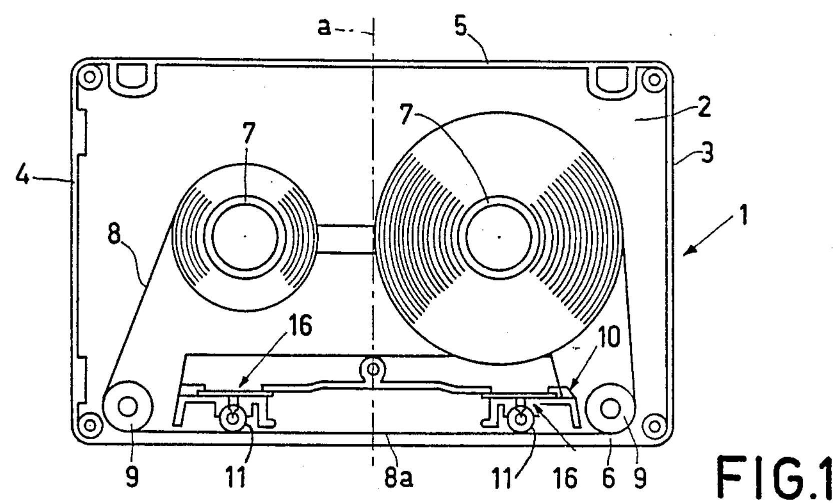
FIG. 1 is a plan view of the interior of a magnetic-tape cassette in accordance with the invention.

The magnetic-tape cassette 1 shown in FIG. 1 comprises major walls 2, which extend substantially parallel to each other and have a substantially rectangular circumference. Moreover, the magnetic-tape cassette 1 comprises substantially parallel side walls 3 and 4, a rear wall 5 and a front wall 6. Inside the cassette 1 reel hubs 7 are mounted for rotation and contain spools of magnetic tape 8. Near the frontmost corner points of the magnetic-tape cassette the magnetic tape 8 is guided around guide rollers 9, so that the part 8*a* of the magnetic tape which extends along the front wall 6 is transportable substantially parallel to this wall. In a manner not shown the front wall 6 is formed with openings through which parts of a magnetic-tape apparatus, not shown, can penetrate into the cassette housing to cooperate with the part 8*a* of the magnetic tape. At a short distance from the front wall 6 a partition 10 is situated, which ensures that dirt which penetrates through the openings in the front wall 6 cannot reach the interior of the cassette housing.

In the major walls 2 substantially circular openings 11 are formed for the passage of a capstan of the magnetic-tape-cassette apparatus. The openings 11 are disposed adjacent the front wall, symmetrically relative to a plane a perpendicular to the major walls 2 at equal distances from the side walls 3 and 4. Other parts of the cassette housing, including the partition 10, are also situated symmetrically relative to the plane a. This enables the cassette 1 to be placed on the magnetic-tape-cassette apparatus with the capstan extending through either one major wall 2 or the other major wall 2; that is, the cassette is of the reversible type.

Figure 2:
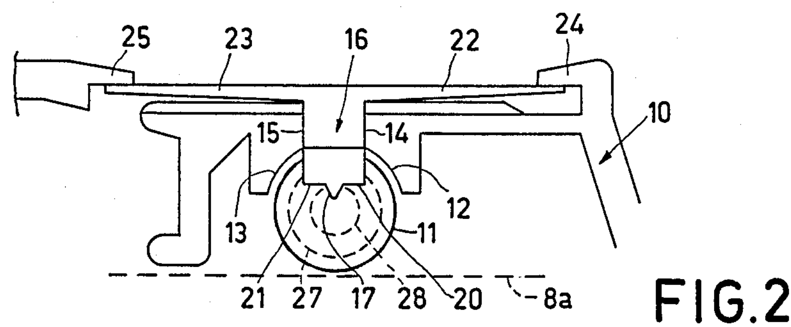
FIG. 2 is a view, on an enlarged scale, of the cleaning element with parts of the housing of the cassette as shown in FIG. 1.

The partition 10, as is shown in FIGS. 1 and 2, is provided with partly circular walls 12 and 13 near the two openings 11, which walls are curved around the opening 11 as shown in FIG. 2. Guide walls 14 and 15 adjoin the walls 12 and 13 and bound an opening in the partition 10. The guide walls 14 and 15 extend substantially perpendicularly to the front wall 6. They guide the side walls of a cleaning element 16, which is thus movable substantially perpendicularly to the front wall 6. The cleaning element 16, which is shown in more detail in FIG. 3, comprises a pointed cleaning portion 17 near the free end. As shown in FIG. 2, the cleaning portion 17 is pointed, preferably with an angle of 70° to 90°. In a direction perpendicular to the major walls 2 the cleaning portion adjoins obliquely oriented sliding walls 18 and 19 near both ends, which walls serve to facilitate the cooperation of the cleaning element 16 with the capstan of the magnetic-tape apparatus during insertion.

On both sides the side of the cleaning element which faces the front wall 6 adjoins flat wall portions 20 and 21, which preferably extend substantially parallel to the front wall 6. Near the end which is remote from the cleaning portion 17 the cleaning element 16 comprises two elastic limbs 22 and 23 of substantially equal length, which limbs form spring means which urge the cleaning element towards the front wall 6, the limbs abutting with the partition 10 in the position shown in FIG. 2. In this way the limbs 22 and 23 ensure that the cleaning portion 17 is pressed against the capstan during operation. In the position shown in FIG. 2 the limbs 22 and 23, which are integral with the remainder of the cleaning element and which are preferably made of polyacetal, extend substantially perpendicularly to the guiding direction of the cleaning element and are slightly tapered towards the free end to obtain the necessary elasticity. Near the free ends the limbs 22 and 23 act against guide portions 24 and 25 which form part of the partition 10.

Figure 3:
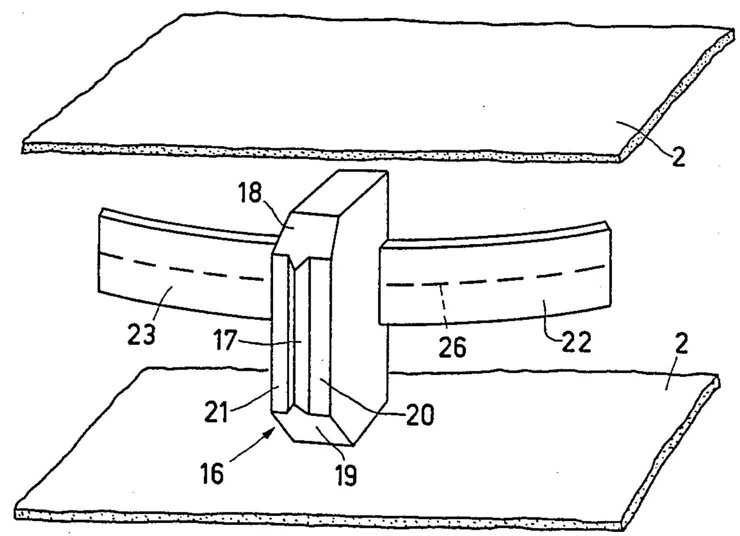
FIG. 3 is a perspective view of the cleaning element.

Viewed in FIG. 3, the height of the limbs 22 and 23 is smaller than the height of the cleaning element 17. In the present embodiment the limbs have a height which is about 40% of the height of the cleaning portion 17. Moreover, the cleaning element is arranged symmetrically between the two major walls 2 relative to a plane of symmetry which is disposed at equal distances from the major walls, the intersection of this plane with the limbs being indicated by the broken line 26 in FIG. 3.

The operation of the magnetic-tape cassette with cleaning elements in accordance with the invention is as follows. During operation the cassette is placed on a magnetic-tape apparatus, the capstan extending through the opening 11. In the case of an auto-reverse apparatus two capstans extend through the two openings 11 in FIG. 1. During insertion the cleaning elements 16, as already stated, can readily move over the capstan owing to the presence of the sliding walls 18 and 19, the smaller height of the limbs 22 and 23 allowing the cleaning element 16 to be tilted to enable an obliquely tilted insertion of the cassette, as is customary for example in the case of a cassette cover. During this movement the limbs 22 and 23 deflect elastically, the guide walls 14 and 15 ensuring the correct guidance of the cleaning element 16. After loading the pointed part of the cleaning portion 17 is radially pressed against the capstan. As is indicated by dashed lines in FIG. 2 it is important that the cleaning element 16 can adapt itself to the capstan diameter. The dashed line 28 represents the conventional minimum diameter of the capstan and the dashed line 27 the customary maximum diameter of the capstan. During operation the free end of the cleaning portion 17 will be situated between the dashed lines 27 and 28. It is thus important that the contact area of the cleaning portion 17 with the capstan be situated substantially diametrally relative to the contact area of the capstan with the part 8*a* of the magnetic-tape, so that the inoperative cleaning element 16 does not obstruct a magnetic head, such as an erase head, which extends through the relevant opening in the front wall 6.

During operation the forces exerted on the cleaning element 16 by the capstan are effectively transmitted to the other parts of the housing via the guide walls 14 and 15 and to the apparatus via the housing. This effectively precludes the occurrence of vibrations in the cleaning elements. Moreover, the occurrence of stick-slip effects is precluded by the radial position of the point of the cleaning portion 17. This ensures that during operation the operative portion 17 constantly cleans the capstan. The dirt removed from the capstan can be transferred via the cleaning portion 17 to the walls 20 and 21, where an adequate capacity for collecting dirt is available. It has been found in practice that with this construction the dirt produced during use of the cassette can be collected effectively, while excessive amounts of dirt can emerge through the openings 11 or the openings in the front wall 5. Moreover, it has been found that, because the cleaning element 16 prevents the capstan from being soiled, the desired circularly cylindrical shape of the capstan is maintained. Therefore, the capstan does not cause axial deviations of the tape transport. Such axial deviations caused by a soiled capstan cause azimuth errors of the tape transport past the magnetic head, which leads to loss of treble tones both during playback and recording. In this way, the cleaning action ensures that soiling cannot cause azimuth errors. In practice, soiling and the consequent condical shape of the capstan not only gives rise to azimuth errors but also to tape-transport faults near the pressure rollers 9 and jamming of the spools of magnetic tape 8 around the hubs 7. The tape edges may then become creased and damaged. The cleaning action of the cleaning element 16 also effectively precludes the occurrence of such effects.

Figure 4:
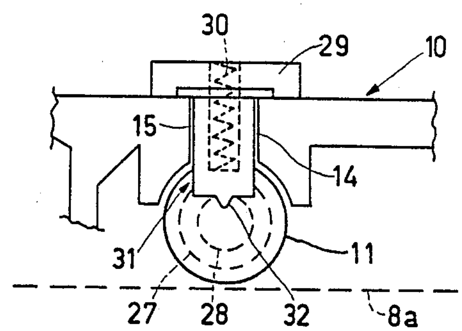
FIG. 4 is a view of the cleaning element and parts of the housing of a magnetic-tape cassette in a second embodiment.

In the embodiment shown in FIG. 4 the partition 10 is provided with a supporting portion 29 carrying a compression spring 30 on the side which is remote from the front wall 6. In the same way as the limbs 22 and 23 in the preceding embodiment the spring 30 also functions as a spring means resiliently supporting a cleaning element 31 which for in all other respects is of the same construction as the cleaning element 16 in the preceding embodiment and which is also provided with a pointed cleaning portion 32. In this way it is also possible to arrange a cleaning element in the magnetic tape cassette, the compression spring 30 providing a suitable pressure of the element on the capstan.

It is to be noted that in the case of non-reversible cassettes, when the capstan has to be inserted into the housing in one position only, only one cleaning element is required. It is to be noted also that in the case of a non-reversible cassette one of the sliding walls 18 or 19 may be dispensed with. The cleaning portion 17 on the relevant side of the cleaning element may then be uninterrupted.

I claim:

1. A magnetic-tape cassette comprising:

a housing having two substantially parallel major walls and a front wall, and an opening adjacent said front wall, for passage therethrough of a capstan of a magnetic-tape apparatus, the capstan having a free end and being rotatable about an axis perpendicular to said major walls, a length of magnetic tape disposed in said housing, arranged to be transportable along and generally parallel to said front wall between the front wall and the capstan so as to be engageable by said capstan, and a cleaning element, disposed near said front wall, comprising a free end and a cleaning portion which is pointed towards the capstan free end, arranged for engaging said capstan for cleaning the capstan during operation while said tape is engaged by the capstan and is being transported, characterized in that said housing includes two guide walls between which said cleaning element is guided for movement in a direction substantially perpendicular to the front wall, and the cassette comprises spring means for urging said cleaning element towards the front wall, said guide walls and spring means being arranged such that during operation the cleaning element presses substantially radially against said capstan.

2. A cassette as claimed in claim 1 characterized in that, in a direction perpendicular to said major walls, said cleaning portion has two ends, and said cleaning element has a respective obliquely arranged sliding wall adjoining each of the ends of said cleaning portion, said sliding walls being arranged for smooth sliding movement of the cleaning element along the free end of the capstan when the cassette is being inserted into a magnetic-tape apparatus.

3. A cassette as claimed in claim 2 characterized in that, on the side which faces the front wall, the cleaning element comprises flat wall portions on both sides of the cleaning portion.

4. A magnetic-tape cassette comprising:

a housing having two substantially parallel major walls and a front wall, and an opening adjacent said front wall, for passage therethrough of a capstan of magnetic-tape apparatus, the capstan having a free end and being rotatable about an axis perpendicular to said major walls, a length of magnetic tape disposed in said housing, arranged to be transportable along and generally parallel to said front wall between the front wall and the capstan so as to be engageable by said capstan, and a cleaning element, disposed near said front wall, comprising a first free end and a cleaning portion which is pointed towards the capstan free end, arranged for engaging said capstan for cleaning the capstan during operation while said tape is engaged by the capstan and is being transported, characterized in that said housing includes two guide walls between which said cleaning element is guided for movement in a direction substantially perpendicular to the front wall, the cleaning element has a second end remote from the cleaning portion, and comprises two elastic limbs of substantially equal length having free ends and extending substantially perpendicularly to said movement direction of the cleaning element, and the cassette comprises guide portions connected to the housing, said limbs being movable with respect to said guide portions in the longitudinal direction of the limbs, and said guide walls and limbs being arranged such that during operation the cleaning element presses substantially radially against said capstan.

5. A cassette as claimed in claim 4, characterized in that, in a direction perpendicular to the major walls, said limbs have a height less than the height of the remainder of the cleaning element; and the cassette has a plane of symmetry situated equidistantly between said major walls, said cleaning element being arranged symmetrically relative to said plane and being tiltable about an axis parallel to said limbs so as to ensure correct engagement of the cleaning element with the capstan.

6. A cassette as claimed in claim 5, characterized in that, in a direction perpendicular to said major walls, said cleaning portion has two ends, and said cleaning element has a respective obliquely arranged sliding wall adjoining each of the ends of said cleaning portion, said sliding walls being arranged for smooth sliding movement of the cleaning element along the free end of the capstan when the cassette is being inserted into a magnetic-tape apparatus.

7. A cassette as claimed in claim 6, characterized in that, on the side which faces the front wall, the cleaning element comprises flat wall portions on both sides of the cleaning portion.

8. A cassette as claimed in claim 4, characterized in that, in a direction perpendicular to said major walls, said cleaning portion has two ends, and said cleaning element has a respective obliquely arranged sliding wall adjoining each of the ends of said cleaning portion, said sliding walls being arranged for smooth sliding movement of the cleaning element along the free end of the capstan when the cassette is being inserted into a magnetic-tape apparatus.

9. A cassette as claimed in claim 4, characterized in that said housing comprises a partition between an interior space and said opening, for preventing passage of dirt into said space, and said guide walls bound an opening through said partition.

* * * * *